Jan. 10, 1939.   H. G. LOMBARD   2,143,603
FASTENING MEANS
Original Filed Dec. 8, 1936   2 Sheets-Sheet 1
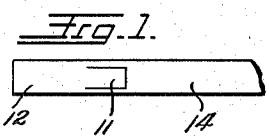
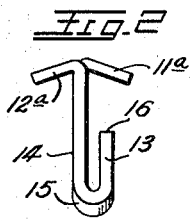
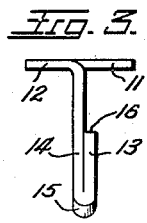
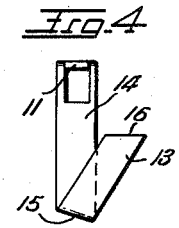
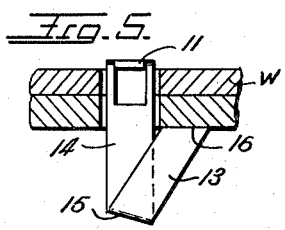
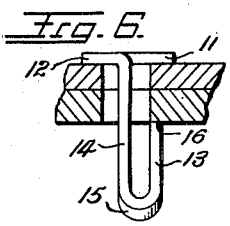
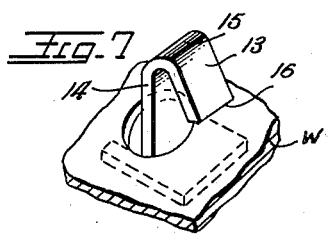
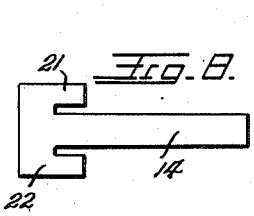
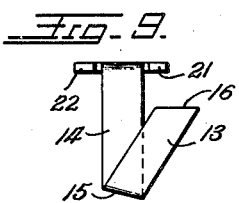
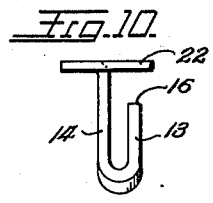
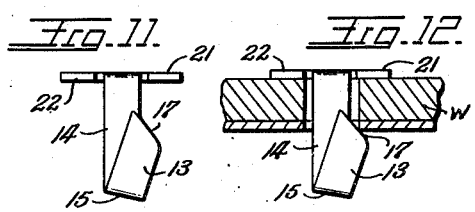
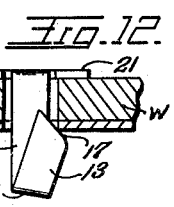
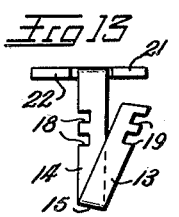
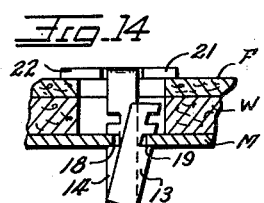
Inventor
Herman G. Lombard
By
Attorney Jan. 10, 1939. H. G. LOMBARD 2,143,603
FASTENING MEANS
Original Filed Dec. 8, 1936   2 Sheets-Sheet 2
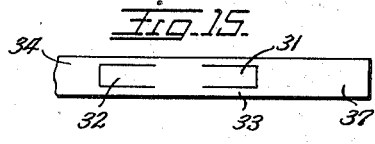
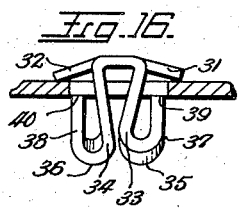
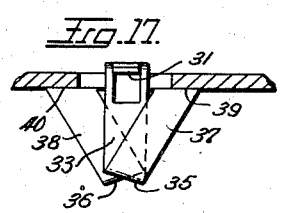
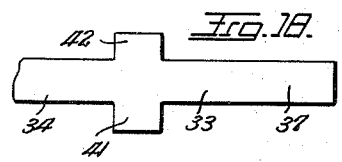
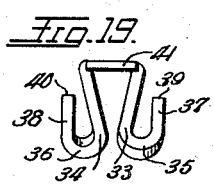
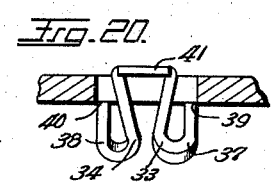
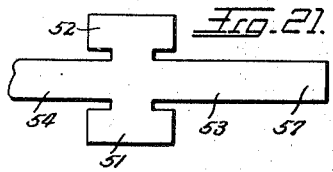
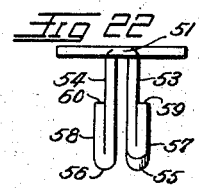
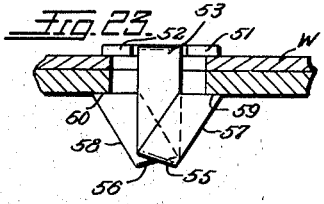
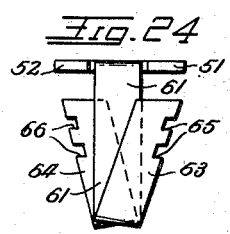
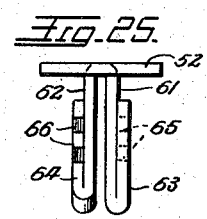
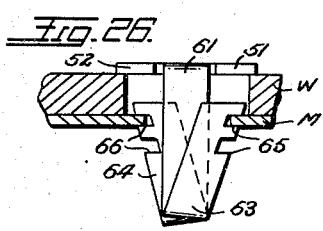
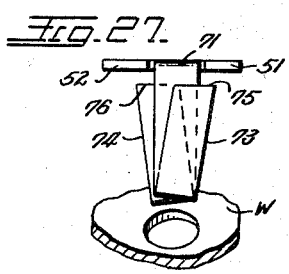
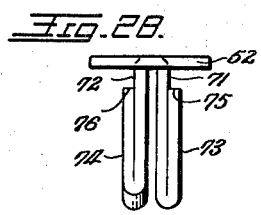
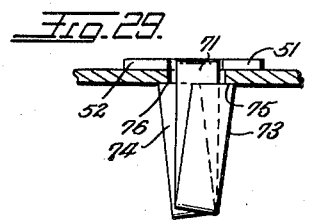
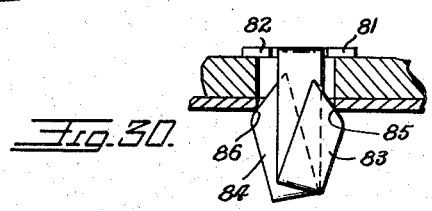
Inventor
Herman G. Lombard
Attorney Patented Jan. 10, 1939

2,143,603

UNITED STATES PATENT OFFICE 2,143,603

FASTENING MEANS

Herman G. Lombard, Washington, D. C., assignor to Albert H. Tinnerman, Cleveland, Ohio Original application December 8, 1936, Serial No. 114,825, now Patent No. 2,077,120, dated April 13, 1937. Divided and this application March 4, 1937, Serial No. 129,063

7 Claims. (Cl. 85—5)

This invention relates to fastening means of general application and of the type constructed from relatively thin material of sheet or strip form such as sheet spring steel, sheet metal, cold rolled metal, flattened wire or the like.

This application is a division of a prior copending application entitled "Fastening means", Serial No. 114,825, filed December 8, 1936, since issued as Patent Number 2,077,120, April 13, 1937.

More particularly, the fastening means of this invention comprise various forms of devices in which the shank structures consist of relatively yieldable leg elements the longitudinal edges of which are out of line in normal relation, such as to effect an engagement thereof under tension in fastening position against the side-walls or edges of an aperture in work.

Fastening devices of the type with which this invention deals are usually constructed of metal sheet material of suitable thickness, such as strip stock, or blank stampings from relatively wide stock. In the forming operation, the devices are so constructed as to provide various types of shank structures comprising relatively yieldable leg elements or shank sections, the head structures being suitably formed for cooperating with an object to be secured or part to be supported.

In any form of fastening device in which there is obtained a yieldable relation of the shank sections or leg elements, an effective fastening means is provided in that on applying such a device to work in an aperture of less width or diameter than the spacing or overall width of the shank sections, a tension is set up in such shank sections, which tension provides a friction, press fit of the device in fastening position intended to prevent loosening and removal of the device from such position.

Heretofore, such fastening devices have been used somewhat satisfactorily in applications where no great degree of movement or vibration takes place in the work or members fastened or supported. However, where any degree of strain, jarring or vibration takes place, the shanks of such types of fasteners tend to loosen from their fastening position and eventually become completely removed due to the fact that the sections or elements comprising the shank do not possess sufficient inherent holding power and ability under such conditions.

It is therefore an object of this invention to provide various forms of fastening means and securing devices in which the shanks are composed of relatively yieldable elements or leg sections so disposed with respect to each other as to permit quick, easy insertion of the devices into a work aperture by a flexing and relative yielding thereof, yet when in fastening position, have such a degree of stiffness rigidity and tension, stored therein through contact and compression against the side walls of the aperture that a tension is set up in the shank sections whereby substantial resistance is offered to withdrawal of the devices and extraordinary resistance is provided against loosening or tendency of the devices moving from applied position due to vibration, jarring or strain set up in the members fastened or in a member to which the device is applied.

It is a further object of this invention to provide various forms and constructions of fastening means and securing devices in which the shank members are composed of relatively yieldable shank sections which are so spaced in normal, untensioned relation as to engage the side-walls of the work aperture under compression in applied fastening position, whereby a tension is set up in the shank sections to effect a friction or press fit of the securing devices in such fastening position.

A further object of the invention is to provide securing devices the shank elements of which are so disposed in normal, spaced relation as to be placed under compression in contact against the aperture side walls to seat under tension in fastening position, the said shank sections being provided with integral, projecting or lug means such as shoulders, teeth, or cam surfaces serving to securely engage the work in fastening position, and thereby rigidly retain the devices in such position under tension due to the relative contraction, compression, and movement of said shank sections from their normal, spaced relation on being applied to a work aperture and advanced to fastening position, whereby an effective seating and locking of the devices in such fastening position is obtained due to the action of the shank sections in attempting to assume their initial, normal, laterally spaced relation.

Another object of the invention aims to provide various forms of a fastening device in which the shank members comprise relatively yieldable leg elements or shank sections depending from substantially rigid head members.

A further object of the invention is to provide fastening devices comprising relatively yieldable leg elements depending integrally from substantially rigid head members.

Further objects and advantages of the invention will be apparent to those skilled in the art as a description thereof proceeds with reference to the accompanying drawings in which like reference characters designate like parts throughout the same, and in which:

Fig. 1 represents a blank outline from which a form of the device may be constructed, parts of the blank being broken away;

Fig. 2 is an end elevation of a form of device constructed from the blank of Fig. 1;

Fig. 3 is an end elevation of an alternate form constructed from the blank of Fig. 1;

Fig. 4 is a side elevation of Fig. 3;

Fig. 5 shows the device in side elevation as applied to fastening position in work;

Fig. 6 is an end view of Fig. 5;

Fig. 7 is a bottom view in perspective of Fig. 6;

Fig. 8 represents an alternate form of blank outline;

Fig. 9 is a side view of a device constructed from the blank represented in Fig. 8;

Fig. 10 is an end elevational view of Fig. 9;

Fig. 11 shows a form of device in which the shank includes a leg element having a cam shoulder permitting ready withdrawal of the device;

Fig. 12 shows the device of Fig. 11 as applied to fastening position in work;

Fig. 13 represents a form of device in which a plurality of shoulders are provided on the outer longitudinal edges of the relatively yieldable legs, adapting the device for locking engagement in various thicknesses of work;

Fig. 14 shows the device of Fig. 13 as applied to fastening position for securing superposed layers of work;

Fig. 15 represents a blank outline for another form of fastening device, parts of the blank being broken away;

Fig. 16 shows applied to fastening position in work, a form of device construction from the blank of Fig. 15;

Fig. 17 is a side view of Fig. 16;

Fig. 18 illustrates an alternate blank outline for a form of fastening device, parts of the blank being broken away;

Fig. 19 in an end view of a completed fastener constructed from the blank of Fig. 18;

Fig. 20 shows the device of Fig. 19 as applied to fastening position in work;

Fig. 21 shows an alternate blank outline for a form of device, parts of the blank being broken away;

Fig. 22 is an end elevational view of a device constructed from the blank of Fig. 21;

Fig. 23 shows the device of Fig. 22 as applied to fastening position in work, the device being shown in side elevation;

Fig. 24 is a side elevational view of a modification in which the outer longitudinal edges of the shank legs are provided with a plurality of work-engaging shoulders;

Fig. 25 is an end view of Fig. 24;

Fig. 26 shows the device of Figs. 24 and 25 as applied to fastening position in work;

Fig. 27 shows in side elevation a further modification about to be applied to apertured work;

Fig. 28 is an end view of the fastener of Fig. 27;

Fig. 29 shows the device of Figs. 27 and 28 as applied to fastening position in a layer of work; and Fig. 30 shows a form of the device in which the shank legs are provided with cam shoulders permitting withdrawal of the device.

The various forms of fasteners disclosed are preferably constructed of a section of flat material such as sheet metal, sheet spring steel, flattened wire and the like. A number of forms are shown as constructed from ordinary strip stock while other types are shown as formed from blanks of a certain outline stamped from sheet stock material.

In the prior co-pending application above mentioned, of which this application is a division, there are shown various forms of fastening devices in which the shanks are constructed from the material intermediate the free ends of a strip or blank, the free ends of the device being suitably deformed to cooperate with an object to be secured or part to be supported.

The devices herein disclosed are each formed from a strip or blank to provide a head member composed of substantially rigid head sections and a shank depending from said head member; the shanks in each form are composed of or include relatively yieldable leg sections, offset in normal, untensioned relation to present the outer longitudinal edges of leg sections in diverging relation toward the head member such that a gradual, relative contraction of the shank legs from their normal relation is effected on application of the devices to fastening position in apertured work.

As illustrated in Fig. 2, the diverging leg elements in any form may be disposed in spaced relation or adjacent each other as in Fig. 3. Also, as shown in Fig. 2, the head sections in any of the forms of devices herein disclosed may be disposed downwardly toward the shank to serve as a yieldable take-up means such that there is no axial play of the device in fastening position; such result is obtained due to the axial pull exerted by the yieldable head sections on the shank whereby the engaging shoulder or shoulders are drawn to firm, snug engagement with the adjacent underface of the work. Further, by so utilizing the head sections as a take-up means, the various forms of devices are readily adapted for use in various thicknesses of work.

It is also intended as within the scope of this invention that the head sections in any form of device be suitably deformed for connection to a part to be secured, such as a molding, panel, or the like, or for cooperation with an object to be supported such as a line, wire, tube, cable, or the like.

Preferably, the diverging leg elements of the shank are provided by bending the strip or blank back upon itself in a return bend or fold extending at an acute angle to the longitudinal edges of the strip. On bending the strip to thus dispose the fold at an angle, the leg elements so provided must naturally lie offset with respect to each other in normal, untensioned relation.

Since the degree of offset of the legs is determined by the angle of the fold, the disposition of the legs relative to each other, in normal position is a laterally offset or other form of offset relation; this offset relation may be so designed as to be most effective in an aperture of predetermined size in any desired location or installation.

The offset relation of the legs is such that the outer longitudinal edges of the legs extend in diverging relation toward the head and serve as guide edges such that upon insertion and advancing of a device to fastening position in an aperture of less width or diameter than the distance between the outer longitudinal edges of the legs in their normal, untensioned, offset relation, the legs are caused to move gradually from their offset relation to a position slightly offset or approaching alignment. Such a movement of the legs away from their normal, untensioned, laterally offset relation is designed to set up an extraordinary tension in the legs through contact and compression against the adjacent walls of the aperture. In many instances, the tension thus exerted is sufficient to maintain the device rigidly in fastening position in the work due to the unusual frictional engagement thus obtained against the side walls of the aperture. Where such frictional engagement alone is sufficient to maintain the fastener in its applied position, the devices may be utilized as a separable fastening means and be withdrawn and removed as desired without mutilating or otherwise injuring the same. On removing the fastener from the aperture, the legs naturally tend to assume their normal, untensioned, offset relation, such that the fastener may again be employed in the installation from which it was removed, much in the manner of a push or snap-stud. For example, in the installation of a panel structure in the door frame of an automobile, very often it is necessary that the panel be removed to replace the window or repair its operating parts. In such instances, a fastener of the type above described, which is held in place by a frictional contact of the legs against the aperture side walls, and which is therefore readily applied and easily removed without injuring the same, is highly efficient.

In many other instances, however, it is necessary or desirable that the fastening devices be not readily removed or easily withdrawn from applied position. In such instances, it is decidedly advantageous to employ on the legs some form of locking means to act in addition to the frictional engagement of the legs against the aperture side walls. Such locking means may be in the form of abutments, recesses, projections, lugs, or series of teeth disposed on the legs along the longitudinal edges such as to firmly contact and rigidly engage the aperture side-walls and the adjacent underface of the work.

Figs. 1–7 inclusive show a form of the fastening means which may be constructed from a strip or blank of material such as represented in Fig. 1 From within the longitudinal edges of the strip is stamped a head section 11, which together with the adjacent end portion 12 of the strip form the head sections of the device as shown in Fig. 3.

If desired the head sections may be bent downwardly toward the shank as at 11a, 12a, Fig. 2, to serve as a yieldable take-up means such that there is no axial play of the device in fastening position and also to adapt the device for use in various thicknesses of work.

As shown in Fig. 4, the return bend or fold 15 is disposed at an angle to the longitudinal edges of the strip such that the shank legs 13, 14 are relatively yieldable and the shorter leg 13 is laterally offset relative to the longer leg whereby the free end thereof provides a pronounced shoulder 16 designed to effect a positive locking of the device in fastening position by engaging against the adjacent underface of the work as shown in Figs. 5, 6, and 7. The shank legs 13, 14 may be disposed substantially adjacent each other as in Fig. 3 or in spaced relation as in Figs. 2 and 6. The latter form is more advantageous in that the shank may be employed in larger apertures and also, by virtue of the spaced relation of the legs, is more flexible and more readily advanced to fastening position.

The outer longitudinal edges of the shank legs extending in diverging relation toward the head, thus provide effective guide edges by which the device may be readily inserted into a work aperture and advanced to fastening position much in the manner of a snap stud. As the device is advanced to fastening position the diverging edges of the shank legs in camming against the aperture side walls cause a gradual relative contraction of the shank legs from their offset relation to a position slightly offset or approaching alignment until the shoulder 16 clears the adjacent lower face of the work, W, whereupon the shorter leg is free to spring laterally toward its normal offset relation with respect to the main leg 14 into locking engagement with the work as shown in Figs. 5 and 7. If yieldable head sections are employed such as 11a, 12a, Fig. 2, the shoulder 16 is drawn into firm snug engagement with the work by reason of the axial pull exerted on the shank by the said yieldable head sections bearing against the upperface of the work.

Figs. 8–10 inclusive disclose a device having a similar shank structure and which may be formed from a blank such as represented in Fig. 8. In this form the strip element 14 forming the leg elements 13, 14, depends from intermediate head sections 21, 22 forming the head member of the device.

Figs. 11 and 12 show a form of device having a shank structure somewhat similar in construction but designed for use as a separable fastening means. The device may be formed from a blank such as represented in Fig. 1 or Fig. 8 to form the diverging legs 13 and 14. By providing a blunt shoulder in the form of a cam surface 17 on the short leg engaging the work, the device may function as a snap stud with the cam surface in yieldable engagement with the lower corner edge of the work aperture as shown in Fig. 12. This form of device may be readily removed by an axial force applied to the head sections to cause the blunt shoulder 17 to cam against the lower corner edge of the work and act as a guide surface causing a relative contraction of the legs sufficient to pass the shank through the aperture and permit the device to be withdrawn.

Figs. 13 and 14 show a further form of the device designed for a locking action with the work and adapted for use in various thicknesses of material. Along the diverging outer longitudinal edges of the offset, relatively yieldable legs 13, 14, spaced recesses are provided which present series of sharp pronounced teeth or shoulders 18, 19, any opposite pair of which is adapted to engage in locking relation in the work. As shown in Fig. 14, the device may be employed for rigidly securing layers of fabric F, to an apertured metal support M or other supporting object, the lower pair of shoulders 18, 19 positively engaging with the metal section M. For use in securing a layer of material of less thickness, the upper, opposite pair of shoulders would be in engagement with the metal support M or other supporting object.

Figs. 15–30 inclusive show various forms of devices in which the shank structures comprise more than two legs associated with substantially rigid head sections which may be deformed for connection to an object to be secured or part to be supported.

In Figs. 15–17 inclusive is shown a form of device in which the head sections 31, 32 are struck from the strip or blank, Fig. 15, to form the head of the device as shown in Fig. 16. The remaining portions of the strip are bent downwardly from said head to provide a shank composed of pairs of legs 33, 37 and 34, 38. It is preferable, though not essential, that in any of the forms of devices wherein the head member is composed of relatively rigid complementary head sections, that the sections be downwardly bent toward the shank as head sections 31, 32, Fig. 16, such that they are yieldable relative to the shank; any form of the device is thus adapted for use in various thicknesses of work and also is caused to seat snugly in locked fastening position due to axial pull of the said head sections on the shank. As shown in Fig. 16, the shank comprises main legs 33, 34 in the form of return bends or folds 35, 36 providing shorter, auxiliary legs 37, 38. The return bends are disposed at an angle to the longitudinal edges of their respective main legs such that the shorter legs are in laterally offset relation with respect thereto as shown in Fig. 17. The ends of the shorter legs thus present oppositely extending shoulders 39, 40 adapted for locking engagement with the adjacent underface of the work in fastening position. Of course the bends or folds 35, 36, of the respective shank elements or main legs 33, 34, may both be disposed at angles extending in substantially the same direction, whereupon the locking shoulders provided by the short legs are not oppositely disposed as in Fig. 17, but rather, extend in the same general direction to engage the edge of the work aperture and adjacent work surface at substantially adjacent points, with the opposite longitudinal edges of the main legs contacting the opposite side wall of the aperture.

Figs. 18-20 inclusive show a form of device which may be constructed from a blank such as represented in Fig. 18 to provide a shank structure substantially similar to that of Figs. 16 and 17. In this form the sections 41, 42 serve as the head member of the device, the shank being composed of leg members on either side thereof and deformed into return bends to present the diverging legs having shoulders 39, 40 for engaging the adjacent underface of the work as shown in Fig. 20.

Figs. 21-23 disclose a form of the device which may be constructed from a blank such as illustrated in Fig. 21. The head is composed of sections 51, 52 disposed on either side of the shank elements 53, 54 forming the main legs of the device. The main legs are deformed into return bends to provide offset, relatively yieldable shorter locking legs 57, 58 representing shoulders 59, 60 engaging the adjacent underface of the work as shown in Fig. 23. As illustrated in Fig. 22, the shorter legs may be disposed substantially adjacent the main legs 53, 54 or in spaced relation as in Figs. 16 and 19 whereby a greater relative flexibility thereof is obtained.

The various forms of shank structures shown in Figs. 15-23 inclusive may each be designed for positive locking action in various thicknesses of material by the use of abutments, teeth, shoulders, or the like, on the outer longitudinal edges of the shank legs. As shown in Figs. 24-26 inclusive, the outer longitudinal edges of the shorter legs 63, 64 may be provided with recesses presenting series of shoulders 65, 66, any opposite pair of which is designed to positively lock the device in fastening position in a certain thickness of work. As shown in Fig. 26, the upper recesses are so disposed as to engage the edges of an aperture in a metal supporting element or object M to secure a thickness of fibre board (as shown in Fig. 14), or the like, in positive locked position. A thicker fibre board or several layers thereof could be secured by the same device by utilizing the shoulders provided by the lower recesses.

As shown in Figs. 27-29, inclusive, each of the forms of devices may be designed for use in relatively thin work by extending the shoulders 75, 76 of the shorter legs 73, 74 closer to the head of the device to have a predetermined spacing therefrom substantially equal to the thickness of the work. In this form of device the main legs 71, 72, preferably are elongated such that the shorter legs have ready flexibility relative thereto, whereupon the device may be applied to fastening position by a simple axial thrust in the manner of a snap stud to seat the shoulders 75, 76 against the adjacent underface of the work and become firmly and rigidly engaged in applied fastening position.

In certain types of work, as, for example, in a panel installation in a door frame, it is necessary or desirable that the device be readily withdrawn without deforming, mutilating or otherwise injuring the same such that it may be employed in the same or similar installation. In such instances, the shorter legs 83, 84, Fig. 30, depending from the main legs, are provided with blunt shoulders, preferably in the form of cam surfaces 85, 86 permitting the device to be readily applied to fastening position and to maintain the device in position under tension of the contracted, laterally offset, yieldable legs attempting to assume their initial, untensioned, offset relation. This form of the device may be readily withdrawn upon axial force being exerted on the head sections 81, 82 whereupon the cam surfaces 85, 86 act as guide means camming the adjacent edges of the work aperture to cause a relative contraction of the shorter legs with respect to the main legs such that the shank may pass through the aperture and the device be withdrawn.

It is to be understood that any of the specific shank structures shown in Figs. 15 to 30 inclusive may be constructed from the leg elements provided from any of the blank outlines represented in Figs. 15, 18 and 21, respectively, disclosing various methods for obtaining alternate types of head structures to be employed with any of the shank structures herein disclosed.

While the invention has been described in detail with specific examples, such examples are illustrative and are not given as limitations, since other modifications within the spirit and scope of the invention will be apparent to those skilled in the art. Hence, the invention is to be understood as limited only as indicated in the appended claims, in which the intent is to set forth all the novelty over the prior art.

What is claimed is:

1. A fastening device including a head and shank, said shank comprising a strip of sheet metal of substantially uniform width having a bend providing a generally U-shaped shank comprising a pair of leg members integrally united to form a leading end for the device, one of said leg members being of less length than the other and said bend being on a line other than at right angles to the longitudinal axis of the shank whereby said leg members are disposed laterally at an angle to each other in normal untensioned relation to provide a laterally projecting shank portion, said laterally projecting shank portion including a work engaging shoulder engaging in a work aperture to lock the device in applied fastening position under spring tension exerted by said leg members attempting to assume their normal untensioned relation laterally at an angle to each other.

2. A fastening device including a head and shank, said shank comprising a strip of sheet metal of substantially uniform width having a bend providing a generally U-shaped shank comprising a pair of leg members integrally united to form a leading end for the device, said shank thus provided being of greater length than the thickness of the supporting structure to which it is applied, one of said leg members being shorter than the other and said bend being on a line other than at right angles to the longitudinal axis of the shank whereby said leg members are disposed laterally at an angle to each other in normal untensioned relation to present a laterally projecting shank portion on the shorter leg member, said laterally projecting shank portion including a work engaging shoulder engaging the underface of the supporting structure to lock the device in applied fastening position under spring tension exerted by said leg members attempting to assume their normal untensioned relation.

3. A fastening device including a head and a shank, said shank comprising a strip of sheet metal of substantially uniform width having a bend providing a generally U-shaped shank comprising a pair of leg members integrally united to form a leading end for the device, said shank thus provided being of greater length than the thickness of the supporting structure to which it is applied, one of said leg members being shorter than the other and said bend being on a line other than at right angles to the longitudinal axis of the shank whereby said leg members are disposed laterally at an angle to each other in normal untensioned relation to present a laterally projecting shank portion on the shorter leg, said laterally projecting shank portion including a guide edge inclined toward the leading end of the device and a work engaging shoulder, said inclined guide edge causing a gradual relative lateral contraction of said leg members as the device is advanced in an aperture in said supporting structure to engage said shoulder with the underface of the supporting structure to lock the device in applied fastening position under spring tension exerted by said leg members attempting to assume their normal untensioned relation.

4. A fastening device including a head and shank, said shank comprising a strip of sheet metal of substantially uniform width having a bend providing a generally U-shaped shank comprising a pair of leg members integrally united to form a leading end for the device, said shank thus provided being of greater length than the thickness of the supporting structure to which it is applied, one of said leg members being shorter than the other and said bend being on a line other than at right angles to the longitudinal axis of the shank whereby said leg members are disposed laterally at an angle to each other in normal untensioned relation to present a laterally projecting shank portion on the shorter leg, said laterally projecting shank portion including a work engaging shoulder provided at the extremity of said shorter leg and adapted to engage the underface of the supporting structure to lock the device in applied fastening position.

5. A fastening device including a head and a shank, said shank comprising a strip of sheet metal of substantially uniform width having a bend providing a generally U-shaped shank comprising a pair of leg members integrally united to form a leading end for the device, said shank thus provided being of greater length than the thickness of the supporting structure to which it is applied, one of said leg members being shorter than the other and said bend being on a line other than at right angles to the longitudinal axis of the shank whereby said leg members are disposed laterally at an angle to each other in normal untensioned relation to present a laterally projecting shank portion on the shorter leg, said laterally projecting shank portion including a guide edge inclined toward the leading end of the device and a work engaging shoulder provided from the extremity of said shorter leg, said inclined guide edge causing a gradual relative lateral contraction of the leg members as the device is advanced in an aperture in said supporting structure to engage the extremity of the shorter leg with the underface of the supporting structure to lock the device in applied fastening position under spring tension exerted by said leg members attempting to assume their normal untensioned relation.

6. A fastening device comprising a sheet metal section having a projecting head provided from substantially the mid-portion thereof and shank members on either side of said head, at least one of said shank members comprising a strip of sheet metal of substantially uniform width having a bend providing a generally U-shaped shank member comprising a pair of leg elements integrally united to form a leading end for the device, one of said leg elements being of less length than the other and said bend being on a line other than at right angles to the longitudinal axis of the shank member whereby said leg elements are disposed laterally at an angle to each other in normal untensioned relation to provide a laterally projecting shank portion on the shorter leg element including a work engaging shoulder adapted to engage in a work aperture under spring tension exerted by said leg elements attempting to assume their normal untensioned relation laterally at an angle to each other.

7. A fastening device comprising a sheet metal section having a projecting head provided from substantially the mid-portion thereof and shank members on either side of said head, at least one of said shank members comprising a strip of sheet metal of substantially uniform width having a bend providing a generally U-shaped shank member comprising a pair of leg elements integrally united to form a leading end for the device, said shank member thus provided being of greater length than the thickness of the supporting structure to which it is applied, one of said leg elements being shorter than the other and said bend being on a line other than at right angles to the longitudinal axis of the shank member whereby said leg elements are disposed laterally at an angle to each other in normal untensioned relation to present a laterally projecting shank portion on the shorter leg including a work engaging shoulder, said work engaging shoulder being formed from the extremity of said shorter leg element and adapted to engage the underface of the supporting structure to lock the device in applied fastening position under spring tension exerted by said leg members attempting to assume their normal untensioned relation.

HERMAN G. LOMBARD.